Aug. 1, 1950 M. M. LEVY 2,516,888

SEQUENTIAL GATING SYSTEM UTILIZING INCREMENTALLY DELAYED AND UNDELAYED PULSE TRAINS OF DIFFERENT FREQUENCIES

Filed Oct. 22, 1946 3 Sheets-Sheet 1

Inventor
Maurice Moise Levy
by
R P Morris
Attorney

SEQUENTIAL GATING SYSTEM UTILIZING INCREMENTALLY DELAYED AND UNDELAYED PULSE TRAINS OF DIFFERENT FREQUENCIES

Filed Oct. 22, 1946

Inventor
Maurice Moise Levy
by
R. P. Morris
Attorney

Aug. 1, 1950 M. M. LEVY 2,516,888

SEQUENTIAL GATING SYSTEM UTILIZING INCREMENTALLY DELAYED AND UNDELAYED PULSE TRAINS OF DIFFERENT FREQUENCIES

Filed Oct. 22, 1946 3 Sheets-Sheet 3

Inventor
Maurice Moise Levy
by
R P Morris
Attorney

Patented Aug. 1, 1950 2,516,888

UNITED STATES PATENT OFFICE 2,516,888

SEQUENTIAL GATING SYSTEM UTILIZING INCREMENTALLY DELAYED AND UNDELAYED PULSE TRAINS OF DIFFERENT FREQUENCIES

Maurice Moise Levy, London, England, assignor to International Standard Electric Corporation, New York, N. Y., a corporation of Delaware Application October 22, 1946, Serial No. 704,971
In Great Britain April 17, 1945

Section 1, Public Law 690, August 8, 1946
Patent expires April 17, 1965

9 Claims. (Cl. 250—27)

The present invention relates to distributor arrangements for rendering operative a plurality of channels or devices cyclically and successively. Such arrangements are used, for example, in multi-channel communication systems for instance utilising electrical pulse modulation. The distributor arrangements, however, are not solely limited in their application to multiple channel communication systems, but may be used for cyclically and successively bringing into operation a plurality of electrically controlled mechanisms. Herein a channel will be referred to, but it will be understood that the term includes any other device to which the distributor arrangements may be applied.

It has heretofore been proposed in the United States application No. 602,803, dated July 2, 1945, now Patent No. 2,462,111, to utilise as a distributor in a multi-channel electrical pulse communication system a delay network or artificial line which comprises a four-terminal passive transmission network which retards the passage of an electrical current propagated therethrough and comprises a plurality of series connected cells each made up of electrical impedances and resistances said cells being preferably alike, each retarding a current by predetermined preferably equal time intervals. If an electrical pulse is applied to the input terminals of the delay network at various tapping points along the network, pulses may be obtained which are delayed by time intervals depending upon the number of cells through which the pulse has passed up to a specified tapping point. These pulses obtained at the various tapping points are then applied to bring the channels of a multi-channel system successively into use. If the network has a large number of cells and theoretically an infinite number, then being equivalent to a transmission line, the pulses suffer very little distortion. With a practical number of cells, however, the fewer the cells for the same delay the greater the distortion of the pulses and it is important in pulse modulation communication systems that the pulses in the channels occur at their correct moments. Hence it is necessary to eliminate the effects due to distortion.

The distortion of the pulses produced by a delay network involves an increase in the pulse duration due to the fact that the instant of commencement of the pulse is advanced and the instant of the termination of the pulse is retarded with respect to the mean pulse time. As a pulse travels along the network the leading and trailing edges of the pulse become less and less inclined to the time axis, the amplitude of the pulse being maintained substantially constant and the duration of the pulse being increased.

It will be seen, therefore, that the time intervals between the commencements of successive pulses tapped off from line sections or cells of a delay network grow successively smaller from the input to the output end of the network and the beginning and end of the pulses get more and more indefinite. Consequently, when the pulses obtained from the delay network are employed directly, for example, to trigger or gate respective circuits which bring the channels into successive use, the timing of the gating or triggering pulses is not sufficiently precise for an efficient multi-channel system.

It is an object of this invention, therefore, to provide a distributor arrangement utilising a delay network which does not suffer from the above disadvantages. Such a distributor arrangement according to the present invention comprises broadly means for producing a train of electrical pulses having a pulse repetition frequency of $nlc$ pulses per second, $n$ being the number of channels and $lc$ a whole number multiple including unity of the number $c$ of distributor cycles per second, means for producing another train of electrical pulses having the pulse repetition frequency of $(n+m)\ lc$ pulses per second, $m$ being any desired integer, means for delaying one of the trains of pulses by time periods equal to progressive multiples of $1/n+1$ of the channel duration $1/nc$ for the respective channels, means for effectively combining the undelayed train and the respective delayed trains and means for each channel responsive to the coincidence of pulses in the respective combined trains.

In the simplest practical embodiment of the invention $l$ and $m$ are each made equal to unity and the delay means comprising a delay network or artificial line which may for instance take the form of a helical inductance coil surrounded by a coaxial cylindrical conductor with tappings at appropriate points along said helical inductance coil.

It will be observed that the total time delay required by the distributor delay network of the present invention is equal to only $1/n+1$ of the delay required in the previously proposed distributor utilising a delay network.

The invention will be better understood from the following more detailed description taken in conjunction with the accompanying drawings. The description is of the application of the distributor to a multi-channel electrical pulse communication system and it will be understood that there is normally a distributor at the transmitting and receiving ends of the system working in co-operation.

In the previously proposed distributor in the form of a delay network, the total delay of the network must be equal to the distributor cyclic period $1/c$. For instance if the distribution frequency is 10 k. c. per second the network must produce a total delay of 100 microseconds. In the distributor according to this invention the total delay required is equal to the distribution cyclic period $1/c$ divided by $n+1$ where $n$ equals the number of channels. For instance in a 10 channel system the total delay required will be 100/11 microseconds and in a 20 channel system (or 10 channel double link) the total delay required will be 100/21 microseconds only and hence the distortion produced in the pulse is practically nil. The distributor according to this invention also has other advantages which will be understood in the course of the description.

For simplicity it will be assumed that the synchronising pulse (or pulses) occupies a channel and also that all the durations or widths of all the channels are equal.

Figure 1:
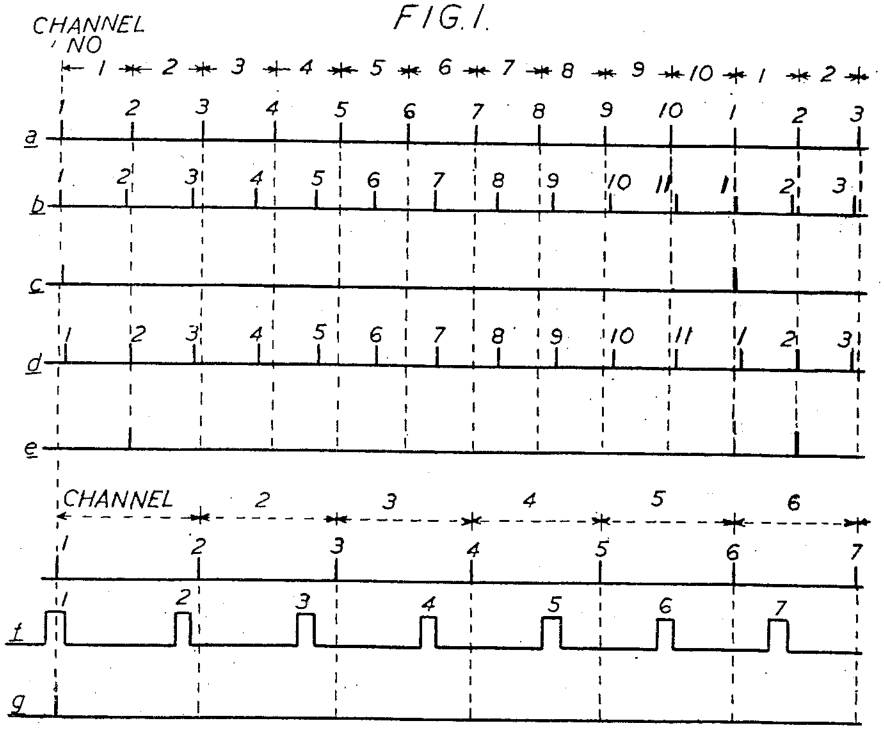
Figure 1 illustrates diagrammatically various series of trains of pulses which will be referred to in the description.

At $a$ in Figure 1 is represented a periodic train of sharp pulses determining the time limits of each channel duration. These pulses have been designated 1–10 on the assumption that the system contains 10 channels. Thus, channel No. 1 is defined by pulses 1 and 2; channel No. 2 by pulses 2 and 3, and so on.

At $b$ in Fig. 1 is represented a second train of periodic pulses. The repetition frequency of this train is such that there are $n+1$ pulses in this train for $n$ pulses in the train $a$, $n$ being the total number of channels in the system. If the distributor frequency is $c$ cycles per second, the pulse repetition frequency of train $a$ is $nc$ and of train $b(n+1)c$. As 10 is the assumed number of channels, train $b$ has 11 pulses occupying the same space as 10 pulses of train $a$. If pulses No. 1 occur at the same moment for the two trains $a$ and $b$, no pulses, except subsequent No. 1 pulses of the train $a$ will appear at the same moment as any pulse of train $b$ and these subsequent No. 1 pulses of train $a$ will likewise coincide with their like-numbered pulses of train $b$. Assuming now that the trains $a$ and $b$ are positive voltage pulses and are applied on the grid of an electron discharge device which is so biassed negatively, that anode current will flow only when two pulses occur at the same moment and their voltages are added together. Such a device will be herein called a gating valve. Thus, the gating valve will give a train of periodic pulses defining always the beginnings of the cyclic durations of the same channel. This new train, which will be called herein the selector train of pulses, is represented at $c$ Fig. 1.

Now assume that the train $b$ of Fig. 1 is shifted in time by an amount $$\frac{1}{nc(n+1)}$$

i. e.

$$\frac{1}{(n+1)c}$$

seconds divided by the number of channels $n$, as represented at $d$ Fig. 1. Then pulses No. 2 of the two trains will coincide and by applying this train of pulses $d$ and the train $a$ to a second gating valve, the second gating valve will produce a selector train of pulses defining the beginning of the following or the preceding channel compared with the first gating valve. This new train of pulses is represented at $e$ Fig. 1. It will be clear that by utilising other time shifts equal to multiples of $$\frac{1}{nc(n+1)}$$

other trains of pulses similar to $c$ and $e$ but shifted in time with respect thereto and defining the commencements of respective channels will be obtained. By this means selector pulses corresponding to each channel will be obtained.

Figure 2:
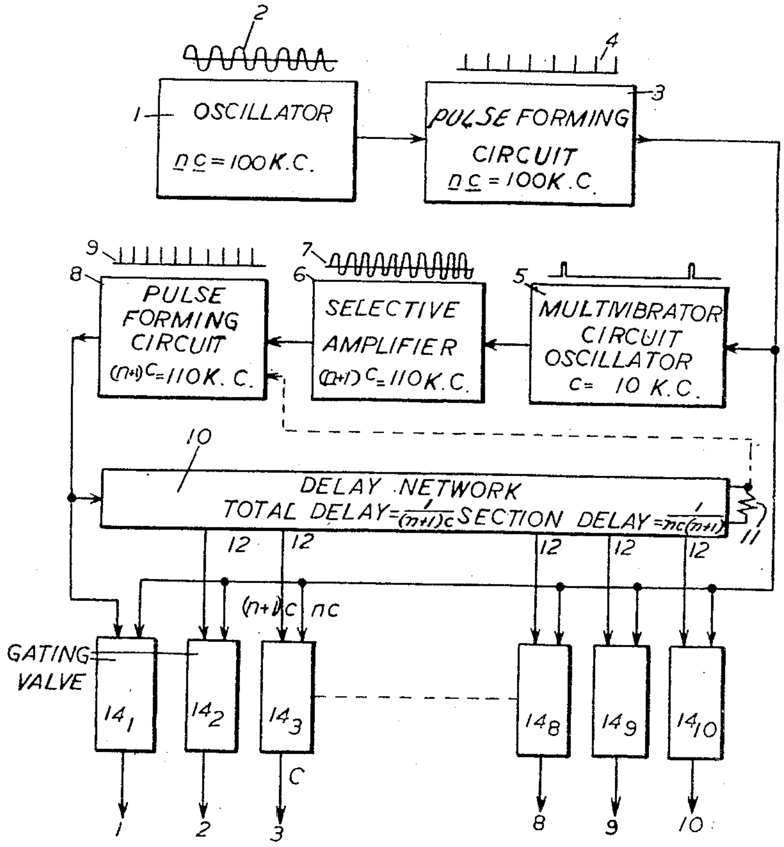
Figures 2 and 3 are block schematic diagrams of distributor arrangements embodying the invention.

Any known arrangement may be used to obtain the successive shifts in time of the train of pulses similar to $d$ Fig. 1. However a preferred arrangement is represented in Fig. 2, embodied in a multi-channel pulse modulation system and is given by way of example.

The production of the relatively timed pulse trains such as $a$ and $b$ or $a$ and $d$, Fig. 1, will first be described. The distributor cyclic frequency will be assumed to be 10 kilocycles (k. c.) per second and the number of channels 10. The pulse repetition frequency $nc$ required is therefor $10 \times 10$ k. c. or 100 k. c. A very stable oscillation generator indicated by block 1 is arranged to generate oscillations at a frequency of 100 k. c. represented at 2 and feeds into a pulse forming circuit indicated by block 3 and may comprise a squaring and/or a differentiating circuit in order to obtain a train of very sharp pulses represented at 4 having a repetition frequency of 100 k. c. This train 4 can be used as the train $a$ of Fig. 1. If the pulses in the output of 3 are not very sharp they may be further sharpened by any known circuit arrangement, usually, as will be seen hereinafter, this train $a$ is applied to a plurality, namely 10 in the present example, of gating valves and the circuit 3 should be designed so that the pulse train can be obtained across a low impedance. As the pulse voltages required are not necessarily great, the design is not very difficult to attain.

The $b$ train of pulses is produced by means of a frequency divider indicated by block 5 which feeds into a frequency multiplier 6. The frequency divider 5 fed from the output of pulse forming circuit 3 may comprise a multivibrator circuit designed to produce a train of sharp pulses at a repetition frequency of 10 k. c. This multivibrator circuit feeds into a selective amplifier 6 tuned to the required multiple frequency of frequency divider 5, namely 110 k. c. in the present example. The selective amplifier 6 may comprise a two stage pentode amplifier of the intermediate frequency type with two simple band-pass filter circuits. Such an amplifier gives a very good sine wave form as indicated at 7 and a good amplitude. The output from such a selective amplifier can easily be squared and differentiated in a pulse forming circuit indicated by block 8 in order to obtain a train of very sharp pulses, having a repetition frequency of 110 k. c. as indicated at 9. The frequency of the pulses thus obtained is very stable and no visible shift of the pulse is apparent on a cathode ray oscilloscope used for monitoring purposes.

The selective amplifier 6 tuned to 110 k. c. and the differentiating circuit 8 are used to obtain the train *b* of pulses of Fig. 1 and all the trains of the same repetition frequency of 110 k. c. are obtained by shifting successively this initial train *b*. The arrangement shown in Fig. 2 indicates a very simple way of obtaining all the shifted *b* trains at once. The initial *b* train is applied to the input of a four terminal passive delay network 10 terminated at its other end by its characteristic impedance 11, and the trains *b* shifted by respective amounts are obtained at successive tappings 12 taken on the network 10.

Figure 3:
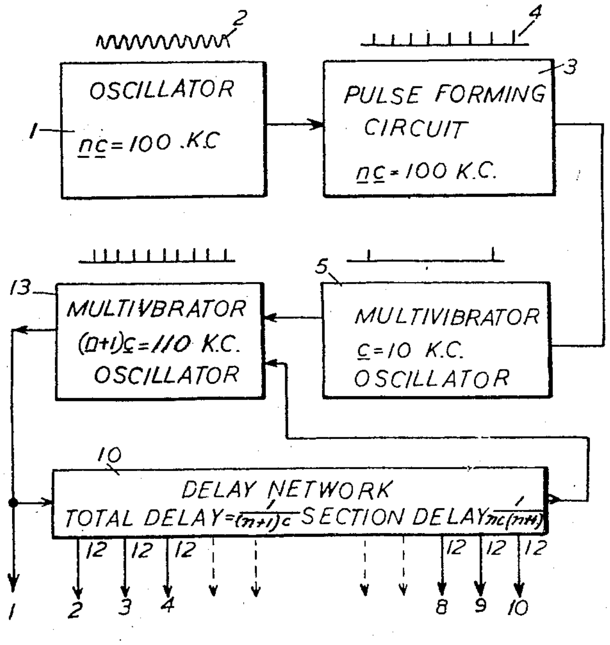

The selective amplifier 6 tuned to 110 k. c. and the pulse forming circuit 8 may be omitted. Such modification is shown in Figure 3 in which the 10 k. c. multivibrator 5 synchronises another multivibrator 13 adjusted to oscillate at 110 k. c. Owing to the fact that the synchronisation is produced every tenth channel the 110 k. c. multivibrator 13 must have a great inherent stability and must be adjusted exactly to operate at 110 k. c. These conditions may be obtained easily with a multivibrator stabilised by a delay network. The variations of the repetition frequency of such a stabilised multivibrator are smaller than ±0.05% when the H. T. supply voltage varies ± 8%. If the multivibrator 13 is first adjusted exactly to operate at 110 k. c. and then synchronised by the 10 k. c. multivibrator 5, any posible shift will be very small. The use of a selective amplifier 6 as indicated in Figure 2 has the advantage that it requires no delicate adjustment.

In an alternative arrangement the selective amplifier 6 Fig. 2 may be followed by a multivibrator stabilised by a delay network and the pulse forming circuit 8 comprising the differentiating circuit is simplified or may even be omitted. In this case the shifted trains *b* are taken off successive tappings on the delay line used for stabilising the multivibrator, as indicated by the broken line from the output end of the delay network 10 to the block 8, which in such case represents a multivibrator circuit.

The pulses of the train *b* need not be so sharp as the pulses of the train *a*. As illustrated at *f* and *g* Fig. 1, the pulses of the train *a* could pass through the gate valve when coincident with the pulses of the train *b* if these latter pulses are wider than those of the train *a*. Two advantages arise from this fact; the first is that the position of each channel is determined by the train *a* of pulses only and thus is very acurately determined since these pulses are very stable in frequency and may be made very sharp; the second advantage is that the delay network 10 need not have a very high cutoff frequency and thus may have a limited number of sections. In the example illustrated in Fig. 2, the delay network 10 produces a total delay of $^{100}/_{11}$ microseconds and has 10 tappings. The delay between two adjacent tappings is $^{10}/_{11}$ microsecond so that the period during which each gate is "open" must be smaller than $^{10}/_{11}$ microsecond. If the delay network were used to define directly the position of the channels as described in United States application No. 602,803, dated July 2, 1945, now patent No. 2,462,111 the total delay would have to be equal to 100 microseconds and the pulse form may be triangular of about 10 microseconds duration. This indicates that the number of sections required is nearly the same in both cases but the network of $^{100}/_{11}$ microseconds delay may be smaller in size than the network of 100 microseconds delay. In the case of the small delay network small continuous lines such as a continuous helical inductance coil in a coaxial outer conductor may be used.

The pulse trains *b* obtained from the respective tappings on the delay network 10 are applied to the grids of respective gating valves $14_1$ . . . $14_{10}$ and the train of pulses *a* obtained from the pulse forming circuit 3 is applied to all the gating valves in parallel as illustrated in Figure 2 to obtain in the outputs thereof the selector trains *c*.

In the case of a multichannel electrical pulse communication system the selector trains *c* of pulses produced by the gating valves $14_1$ . . . $14_{10}$ may be used with any type of pulse modulator.

Figure 4:
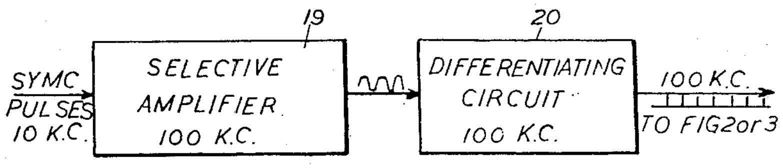
Figure 4 shows in block schematic the modification required at a synchronised distributor arrangement.

The arrangements illustrated in Figs. 2 and 3 must be slightly modified when maintained in synchronism with another distributor, for example when used at the receiver side of a communication system. In one arrangement the synchronising pulses at a frequency of 10 k. c. are isolated in any known manner and applied to a selective amplifier 19, Figure 4 tuned to 100 k. c. The output from the 100 k. c. selective amplifier is fed to a differentiating or other pulse forming circuit arrangement 20 to obtain a pulse train of sharp pulses having a repetition frequency of 100 k. c. which is applied to the 10 k. c. multivibrator 5 (Figures 2 and 3).

In another arrangement a 100 k. c. train is obtained from the channel pulses by means of a selective amplifier.

The arrangements hereinbefore described may be used with a multi-channel pulse modulated communication system utilising complex multivibrators for the channel modulators as described in United States application No. 627,947, dated November 10, 1945, now Patent No. 2,454,815.

While in the foregoing description two embodiments have been given for producing the trains *a* and *b*, having frequencies *nc* and $(n+1)c$ respectively, other arrangements will occur to those skilled in the art. For example, an oscillation generator oscillating at the distributor frequency *c* may be provided together with means for producing therefrom the frequency $(n+1)c$ and the frequency *nc*, the outputs of which may be applied to pulse forming circuits to produce short pulses.

What is claimed is:

1. A distributor arrangement for rendering operative a plurality of channels cyclically and successively comprising means for producing a train of electrical pulses having a pulse repetition frequency of *nlc* pulses per second, *n* being the number of channels and *lc* a whole number multiple, including unity, of the number $c$ of distributor cycles per second; means for producing another train of electrical pulses having its initial pulse coincident with the initial pulse of the first mentioned train and having a pulse repetition frequency of $(n+m)lc$ pulses per second, $m$ being a given integer, means for delaying one of the trains of pulses by time periods equal to progressive multiples of $m/nlc(m+n)$ for successive channels; means for effectively combining the undelayed train and the respective delayed trains and means for each channel responsive to the coincidence of pulses in the respective combined trains for producing output voltages.

2. A distributor arrangement for rendering operative a plurality of channels cyclically and successively comprising means for producing a train of electrical pulses having a pulse repetition frequency of $nc$ pulses per second, $n$ being the number of said channels and $c$ the number of distributor cycles per second, means for producing another train of electrical pulses having its initial pulse coincident with the initial pulse of the first mentioned train and having a pulse repetition frequency of $(n+1)c$ pulses per second, means for delaying one of the trains of pulses by time periods equal to progressive multiples of $1/nc(n+1)$ for successive channels, means for effectively combining the undelayed train and the respective delayed trains, and means for each channel responsive to the coincidence of pulses in the respective combined trains for producing output voltages.

3. A distributor arrangement as claimed in claim 2 wherein said means for delaying one of the trains of pulses by time periods equal to progressive multiples of $$\frac{1}{nc(n+1)}$$

comprises a passive delay network or artificial line consisting of a plurality of series connected four-terminal cells.

4. A distributor arrangement as claimed in claim 2 wherein said means for delaying one of the trains of pulses by time periods equal to progressive multiples of $$\frac{1}{nc(n+1)}$$

comprises a helical inductance coil surrounded by a coaxial cylindrical conductor with tappings at appropriate points along said helical inductance coil.

5. A distributor arrangement as claimed in claim 2 comprising means for producing a voltage wave of the distributor frequency $c$, means for producing therefrom a voltage wave of the frequency $(n+1)c$, means for producing a voltage wave of the frequency $nc$, pulse forming circuits to which said wave of frequencies $(nc)$ and $(n+1)c$ are applied to produce short pulses.

6. A distributor arrangement as claimed in claim 2 comprising means for producing a voltage wave of one of the pulse frequencies $nc$, $(n+1)c$; frequency dividing arrangements to divide said wave of one frequency to derive a voltage wave of the distributor frequency $c$, means for deriving from said wave of frequency $c$ a voltage wave of the other of said frequencies $nc$, $(n+1)c$; pulse forming circuits to which said waves of frequencies $nc$ and $(n+1)c$ are applied to produce short pulses having pulse repetition frequencies of $nc$ and $(n+1)c$.

7. A distributor arrangement as claimed in claim 6 including means for maintaining it in synchronism with another distributor by synchronising pulses comprising means for receiving said synchronising pulses and means for deriving therefrom the said wave of frequency $nc$ or $(n+1)c$.

8. A distributor arrangement as claimed in claim 7, said means for deriving said wave of the frequency $nc$ or $(n+1)c$ comprising a selective amplifier tuned to said frequency $nc$ or $(n+1)c$.

9. A distributor arrangement for rendering operative a plurality of channels cyclically and successively comprising means for producing a train of electrical pulses having a pulse repetition frequency of $nc$ pulses per second, $n$ being the number of said channels and $c$ the number of distributor cycles per second, means for producing another train of electrical pulses having its initial pulse coincident with that of the first mentioned train and having a pulse repetition frequency of $(n+1)c$ pulses per second, means for delaying one of the trains of pulses by time periods equal to progressive multiples of $1/nc(n+1)$ for successive channels, means for effectively combining the undelayed train and the respective delayed trains, and means for each channel responsive to the coincidence of pulses in the respective combined trains, said delaying means comprising a passive delay network or artificial line consisting of a plurality of series connected four-terminal cells, means for producing the distributor frequency $c$, means for producing therefrom the frequency $(n+1)c$, means for producing the frequency $nc$, and pulse forming circuits to which said frequencies $(nc)$, $(n+1)c$ are applied to produce short pulses.

MAURICE MOISE LEVY.

REFERENCES CITED

The following references are of record in the file of this patent:

UNITED STATES PATENTS

| Number | Name | Date |
|---|---|---|
| 2,055,309 | Ramsey | Sept. 22, 1936 |
| 2,403,561 | Smith | July 9, 1946 |
| 2,408,077 | Labin | Sept. 24, 1946 |
| 2,425,600 | Coykendall | Aug. 12, 1947 |